(12) United States Patent
Shigapov et al.

(10) Patent No.: US 8,375,421 B1
(45) Date of Patent: Feb. 12, 2013

(54) ENABLING A VIRTUAL MEETING ROOM THROUGH A FIREWALL ON A NETWORK

(75) Inventors: Andrey Shigapov, Fremont, CA (US); Alexander Koval, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 987 days.

(21) Appl. No.: 11/366,098

(22) Filed: Mar. 2, 2006

(51) Int. Cl.
*G06F 21/00* (2006.01)

(52) U.S. Cl. .......................................................... 726/4

(58) Field of Classification Search ................ 726/4, 17, 726/21
See application file for complete search history.

(56) References Cited

U.S. PATENT DOCUMENTS

| | | | |
|---|---|---|---|
| 5,319,638 | A | 6/1994 | Lin |
| 5,825,890 | A | 10/1998 | Elgamal et al. |
| 6,052,785 | A | 4/2000 | Lin et al. |
| 6,061,454 | A | 5/2000 | Malik et al. |
| 6,079,020 | A * | 6/2000 | Liu .................................. 726/15 |
| 6,223,287 | B1 | 4/2001 | Douglas et al. |
| 6,367,009 | B1 | 4/2002 | Davis et al. |
| 6,392,760 | B1 * | 5/2002 | Ahuja et al. .................. 358/400 |
| 6,584,567 | B1 | 6/2003 | Bellwood et al. |
| 6,643,701 | B1 | 11/2003 | Aziz et al. |
| 6,674,717 | B1 | 1/2004 | Duong-van et al. |
| 6,681,327 | B1 | 1/2004 | Jardin |
| 6,718,388 | B1 | 4/2004 | Yarborough et al. |
| 6,931,016 | B1 * | 8/2005 | Andersson et al. ........... 370/401 |
| 7,340,768 | B2 * | 3/2008 | Rosenberger ..................... 726/4 |
| 2004/0117446 | A1 * | 6/2004 | Swanson ........................ 709/205 |
| 2004/0193677 | A1 * | 9/2004 | Dar et al. ....................... 709/203 |
| 2005/0063303 | A1 | 3/2005 | Samuels et al. |
| 2005/0074007 | A1 | 4/2005 | Samuels et al. |
| 2005/0108420 | A1 | 5/2005 | Brown et al. |
| 2005/0187979 | A1 | 8/2005 | Christensen et al. |
| 2005/0265235 | A1 | 12/2005 | Accapadi et al. |
| 2006/0005240 | A1 * | 1/2006 | Sundarrajan et al. ........... 726/15 |
| 2006/0059370 | A1 * | 3/2006 | Asnis et al. .................... 713/189 |

OTHER PUBLICATIONS

AARNet: Network: Large MTU: Programming (www.aarnet.edu.au. engineering/networkdesign/mtu/programming.html), Dec. 9, 2005.
TCP/IP options for high-performance data transmission (Builder.com.com/5100-6372-1050878.html), Dec. 9, 2005.
Wireless/Networking (compnetworking.about.com/od/tcpip/1/bldef_nagle.htm), Dec. 6, 2005.
TCP. Section—Linux Programmer's Manual (7) (www.fifi.org/cgi-bin/man2html/usr/share/man/man7/tcp.7.gz), Dec. 9, 2005.

(Continued)

*Primary Examiner* — Brandon Hoffman
*Assistant Examiner* — Anthony Brown
(74) *Attorney, Agent, or Firm* — Frommer Lawrence & Haug LLP; Jamie L. Wiegand

(57) ABSTRACT

The invention is directed to managing secure communications using a virtual meeting room (VR) through a firewall. The VR may operate as a virtual subnet managed by a VR server (VRS). A client requests a VR from the VRS. The VRS allocates the virtual subnet, and enables access to requested resources. The VRS provides information and authentication credentials to the client for distribution to other clients. The clients may use the provided information to authenticate to the VRS. In one embodiment, the VRS downloads to each client a virtual room client (VRC) application useable to connect to the VRS and establish a secure communications channel with the VRS and through the firewall. The secure communications channel may be used to communicate through the VRS directly to another client device, and/or broadcast messages to each client within the VR. Communications may be monitored for communication constraint compliance by the VRS.

21 Claims, 6 Drawing Sheets

OTHER PUBLICATIONS

RFC 896—Congestion control in IP/TCP internetworks (www.faqs.org/rfcs/rfc896.html), Jan. 6, 1984.

RSA Laboratories. PKCS #1 v2.0: RSA Cryptography Standard, Oct. 1, 1998.

Berners-Lee et al, RFC 1945, Hypertext Transfer Protocol—HTTP/1.0, Network Working Group, May 1996.

Dierks and Allen, RFC 2246, The TLS Protocol Version 1.0, Network Working Group, Jan. 1999.

Fielding et al., RFC 2616, Hypertext Transfer Protocol—HTTP/1.1, Network Working Group, Jun. 1999.

Kessler, RFC 1739, A Primer on Internet and TCP/IP Tools, Network Working Group, Dec. 1994.

Netscape Communications Corp., "Secure Sockets Layer (SSL) version 3", Mar. 1998.

Paxson, RFC 2525, Known TCP Implementation Problems, Network Working Group, Mar. 1999.

Rescoria, "SSL and TLS—Designing and Building Secure Systems" pp. 1-46, Mar. 2001.

Nagle's Algorithm (Searchnetworking.techtarget.com/sdefinition/0..sid7gci754347.00.html), Dec. 6, 2005.

The OpenSSL Project.

HTTP/1.1 and Nagle's Algorithm (w3.org), Dec. 6, 2005.

Aventail Corporation, "Secure Collaboration", Data Sheet, pp. 1-4, Copyright 2005.

Aventail Corporation, "SSL VPN Secure Collaboration", pp. 1-2, Copyright 2006. Was visited on Jun. 9, 2006 http://www.aventail.corn/prodicts/appliances/sc.asp.

\* cited by examiner

ENABLING A VIRTUAL MEETING ROOM THROUGH A FIREWALL ON A NETWORK

BACKGROUND OF THE INVENTION

The present invention generally relates to enabling network communications and in particular to enabling clients to employ a virtual meeting room through a firewall for secure communications, and/or access to protected a resource.

The growth in data communication traffic, including email, client/server applications, multimedia applications, Internet and intranet applications, has continued with an increasing number of applications being implemented across the networks. Often provided with ample networking infrastructure, an increasing number of applications are being designed and implemented across the network. This is particularly true for enterprise applications. Thus, it is increasingly likely that a corporation's applications will be established across a network.

However, a corporation may use a corporate intranet along with firewalls, or other security perimeter devices, to protect the security of their computing resources. While a security perimeter device is designed to restrict improper flow of network traffic between networks, they may also prevent desirable network traffic flows. For example, the security perimeter device may restrict a network device outside of the corporate intranet from accessing a corporate resource, or perhaps even from collaborating with a network device within the corporate intranet. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified. The drawings are not necessarily to scale, emphasis instead being placed upon illustrating the principles of the invention.

For a better understanding of the invention, reference will be made to the following Detailed Description of the Invention, which is to be read in association with the accompanying drawings, wherein.

DETAILED DESCRIPTION OF THE INVENTION

Figure 1:
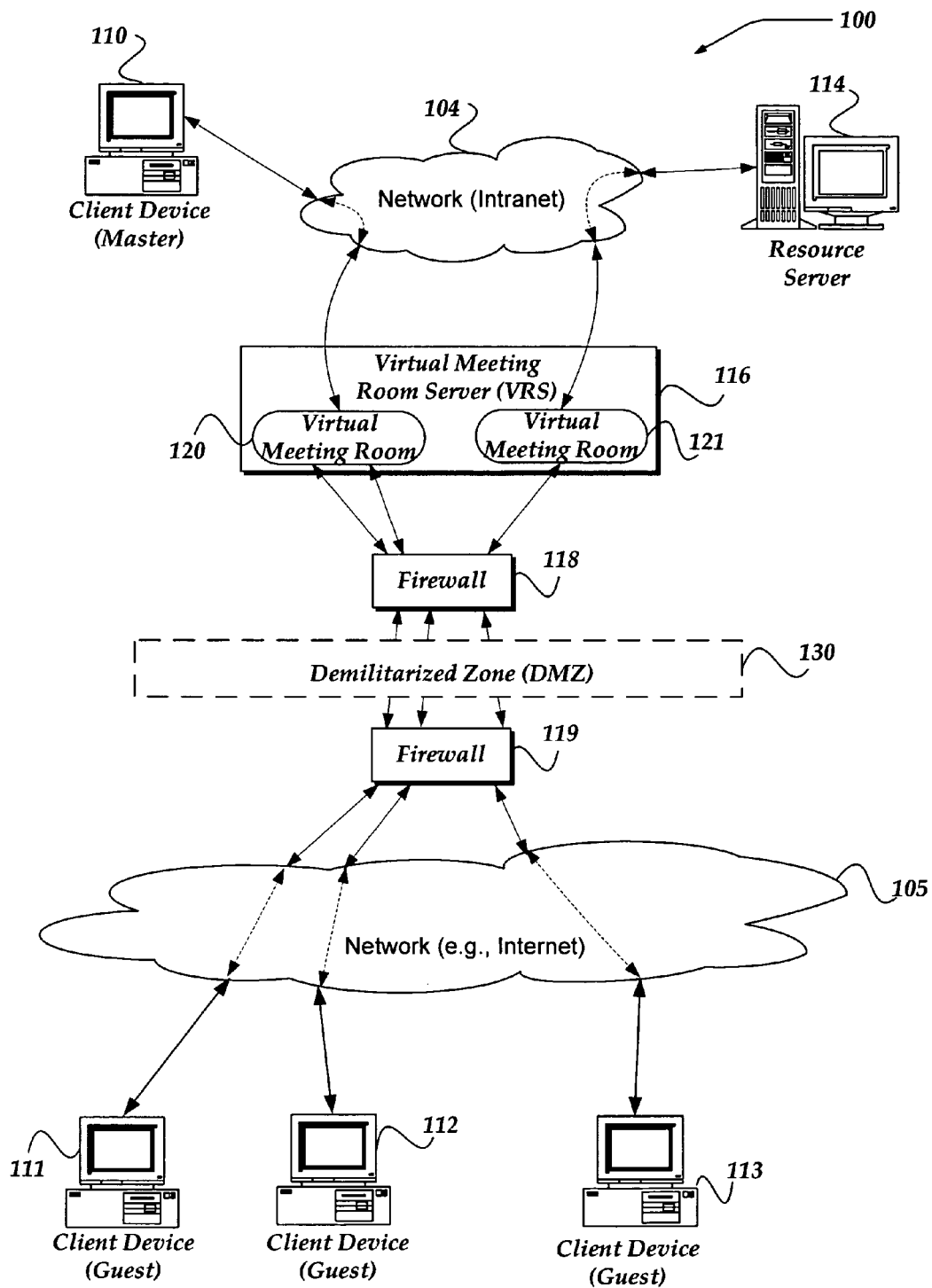
FIG. 1 illustrates one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Nor does the phrase "in another embodiment" necessarily refer to a different embodiment, although it may. Moreover, one or more embodiments may be combined to provide another embodiment, without departing from the scope or spirit of the invention. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "virtual local area network," "VLAN," or "virtual sub-network" is a logical grouping of network devices on a network that makes the network devices appear to each other as if they are on a same physical network segment. A VLAN or virtual sub-network may be implemented using a port configuration, Media Access Control (MAC) based addressing, layer 3 protocol filtering, IP Multicasting, rules-based mechanisms, IEEE 802.1Q frame tagging, or the like.

As used herein, a "virtual meeting room," is a network which utilizes VLAN technology and allows network devices to dynamically join, privately communicate, and exit. Various examples of uses for a virtual meeting room are chat rooms, collaboration rooms, and virtual deal rooms. Moreover, a virtual meeting room may enable access to a protected resource using such as a virtual file room, virtual data room, or the like.

Briefly stated, the present invention is directed towards a system, apparatus, and method for managing secure communications using a virtual meeting room through a firewall. In one embodiment, the virtual meeting room operates as a virtual subnet that may be established and managed by a virtual meeting room server (VRS). The VRS may reside on either side of the firewall and enable secure communications between client devices through the firewall. In addition, the VRS may enable secure access to resources protected by the firewall, such as a corporate server, or the like. The communications between the client devices may employ a virtual private network, a secure tunnel, or the like, and enable a variety of activities, including gaming, telnet, emails, chat, collaboration, as well as access to a variety of applications, documents, or other resources.

A client device, referred to a master device, requests a virtual meeting room (VR) from the VRS. The VRS allocates a virtual subnet, and enables access to requested resources. The VRS may provide a network address, and other virtual meeting room information to the master device. In one embodiment, the VRS may also provide one or more credentials. The master device may then distribute the virtual meeting room information, including the credentials to one or more guest client devices. The client devices, including the master device, may use the provided information, and/or credential, to authenticate to the VRS for access to the virtual meeting room. In one embodiment, the VRS may download to each client device a virtual meeting room client (VRC). The VRC may be used by the client device to connect to the VRS and establish a secure communications with the VRS, and possibly, through the firewall. The secure communications may be used by each client device to communicate through the VRS to another client device, and/or broadcast messages to each client device within the virtual meeting room. The secure communications may also enable the client device to access a resource protected by the firewall. Communications over the virtual subnet may be monitored for compliance to one or more communication constraints by the VRS. Such communication constraints may include, restricting communications from being between virtual meeting rooms, preventing unauthorized access to other resources, restricting communications from other sub-networks, such as an intranet, or the like. Monitoring of the communications may be achieved by directing each communications between client devices through the VRS. Thus, in one embodiment, where one client device is attempting to communicate directly with another client device within the virtual meeting room, the messages are first sent to the VRS. The VRS may decrypt the received message, and examine them for compliance to the communication constraints. If a message complies with the communication constraints, the VRS determines where to redirect the message, encrypt the message, and forwards the message as appropriate. Such communications enables a secure pseudo peer to peer communications in that although both client devices employing the VR to communicate, the communications may be directed to a single client device, rather than merely being broadcast to each client device within the VR. However, the invention is not constrained to such peer to peer communications, and broadcasting of messages through the VR may also be performed.

Illustrative Operating Environment

FIG. 1 illustrates one environment in which the present invention may operate. However, not all of these components may be required to practice the invention, and variations in the arrangement and type of the components may be made without departing from the spirit or scope of the invention. System 100 of FIG. 1 may be employed to enable client devices to request and use virtual meeting rooms over a network, and even through a firewall or other security perimeter devices. Moreover, system 100 may be used to enable access by the client devices to resources that may be protected by the security perimeter.

As shown in the figure, system 100 includes client devices 110-113, networks 104-105, Virtual meeting Room Server (VRS) 116, firewalls 118-119, DeMilitarized Zone (DMZ) 130, and resource server 114. As shown, VRS 116 includes Virtual meeting Rooms (VRs) 1201-121.

Network 104 enables communication between client device 110, resource server 114, and VRS 116. Firewall 118 is in communications with VRS 116 and DMZ 130. Firewall 119 is in communication with DMZ 130 and network 105. Network 105 enables communication between firewall 119 and client devices 111-113.

One embodiment of client devices 110-113 is described in more detail below in conjunction with FIG. 4. Briefly, however, client devices 110-113 may include virtually any computing device capable of communicating over a network to send and receive information, including web requests for information from a server, messages to another computing device, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client devices 110-113 may be any device that is capable of connecting using a wired or wireless communication medium such as a PDA, POCKET PC, wearable computer, and any other device that is equipped to communicate over a wired and/or wireless communication medium.

Client devices 110-113 may further include a client application that is configured to manage various actions. Moreover, client devices 110-113 may also include a web browser application that is configured to enable an end-user to interact with other devices and applications over network 105. Client devices 110-113 may also include other client applications that enable communications over a network to request, join, and/or participate in a virtual meeting room communication.

As shown in FIG. 1, client device 110 is designated as a "master," while client devices 111-113 are designated as "guests." A master client device typically is that device that requests a virtual meeting room (e.g., VR 120-121). The master client device may provide the request for the VR to VRS 116, and receive information for use in enabling guest client devices to join and participate in a virtual meeting using the VR, as described in more detail below. It is noted, however, that the master client device, client device 110 as shown herein, need not be 'within' the protection of DMZ 130. Thus, any of client devices 110-113 may be designated as a master client device, without departing from the scope or spirit of the invention. For example, in one embodiment, client device 113 may operate as a master client device for VR 121, while client device 110 may operate as a master client device for VR 120.

Networks 104-105 are configured to couple one network device with other network devices. Networks 104-105 are enabled to employ any form of computer readable media for communicating information from one electronic device to another. In one embodiment, network 105 may include the Internet, while network 104 may represent an intranet.

Networks 104-105 may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Networks 104-105 may further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks may enable wide area coverage for network devices, with various degrees of mobility. For example, networks 104-105 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, networks 104-105 include any communication method by which information may travel between one network device and another network device.

Additionally, networks 104-105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

A "security perimeter" is an electronic boundary substantially surrounding one or more computing assets. The security perimeter may be implemented through a single network device, such as a switch, router, bridge, server, or the like, or through a variety of network devices. Such network devices typically include applications arranged to inspect network traffic and perform filtering decisions including whether the network traffic may flow through the security perimeter. One embodiment of a network device that includes such filtering application is a firewall. However, the invention is not constrained to firewalls, and packet filters, gateways, proxy servers, or the like may also be included. As shown in FIG. 1, the security perimeter may include firewalls 118-119. In one embodiment, DMZ 130 may also be considered as a component of the security perimeter.

DMZ 130 represents a "middle ground" between an organizations's trusted internal network (e.g., network 104) and an untrusted, external network such as the Internet (e.g., network 105). Sometimes called a "perimeter network," the DMZ is a sub-network (subnet) that may sit between firewalls or off one leg of a firewall. Various network devices may be placed within DMZ 130, including, but not limited to Web servers, mail servers, file servers, database servers, or the like.

Firewalls 118-119 may include any computing device that is designed to prevent unauthorized access to a network, such as network 104, or other computing assets that are to be protected. As such, firewalls 118-119 may be implemented as a router that filters out unwanted packets or may comprise a combination of routers and servers each performing some type of network traffic filtering. For example, firewalls 118-119 may be configured as a packet filter, proxy server, a gateway, a bridge, or the like. As such, firewalls 118-119 illustrate one embodiment of a network device that enables implementation of a security perimeter.

Devices that may operate as firewalls 118-119 include personal computers, desktop computers, multiprocessor systems, microprocessor-based or programmable consumer electronics, network PCs, servers, routers, bridges, network appliances, or the like.

One embodiment of VRS 116 is described in more detail below in conjunction with FIG. 2. Briefly, however, VRS 116 includes virtually any device that manages creation and use of virtual meeting rooms, such as VR 120-121. It should be noted, that although only two VRs are shown, the invention is not so limited. Thus, more, or less virtual meeting rooms may be established and managed by VRS 116, without departing from the scope or spirit of the invention.

Upon request, or based on an event, condition, or the like, VRS 116 may establish a pool of Virtual Internet Protocol (IP) (VIP) addresses that may be assigned to one or more VRs. As a client device requests to join the VR, VRS 116 may assign one of the VIP addresses to the client device. Moreover, VRS 116 may enable communications between the client device and itself using any of a variety of secure communications, including but not limited to TLS, SSL VPNs, IPSec, or the like.

In one embodiment, VRS 116 may also operate generally to manage network traffic. Such devices include, for example, routers, proxies, firewalls, load balancers, cache devices, application accelerators, devices that perform network address translation, any combination of the preceding devices, or the like.

VRS 116 may direct a request for a resource to a particular server device based on network traffic, network topology, capacity of a server, content requested, and a host of other traffic distribution mechanisms. VRS 116 may receive data packets from and transmit data packets to the Internet, an intranet, or a local area network accessible through another network. VRS 116 may recognize packets that are part of the same communication, flow, and/or stream and may perform special processing on such packets, such as directing them to the same server device so that state information is maintained. VRS 116 also may support a wide variety of network applications such as Web browsing, email, telephony, streaming multimedia and other traffic that is sent in packets.

VRS 116 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, or the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. The FirePass® SSL VPN appliances by F5 Networks of Seattle, Wash. are examples of VRSs.

In one embodiment, resource server 114 is configured to operate as a website server. However, resource server 114 are not limited to web server devices, and may also operate a messaging server, a File Transfer Protocol (FTP) server, a database server, content server, application server, or the like. As shown, resource server 114 represents a protected resource because it may be considered within the protection of a security perimeter (e.g., firewalls 118-119, and DMZ 130).

Devices that may operate as resource server 114 include personal computers, desktop computers, multiprocessor systems, microprocessor-based or programmable consumer electronics, network PCs, server devices, or the like.

Figure 2:
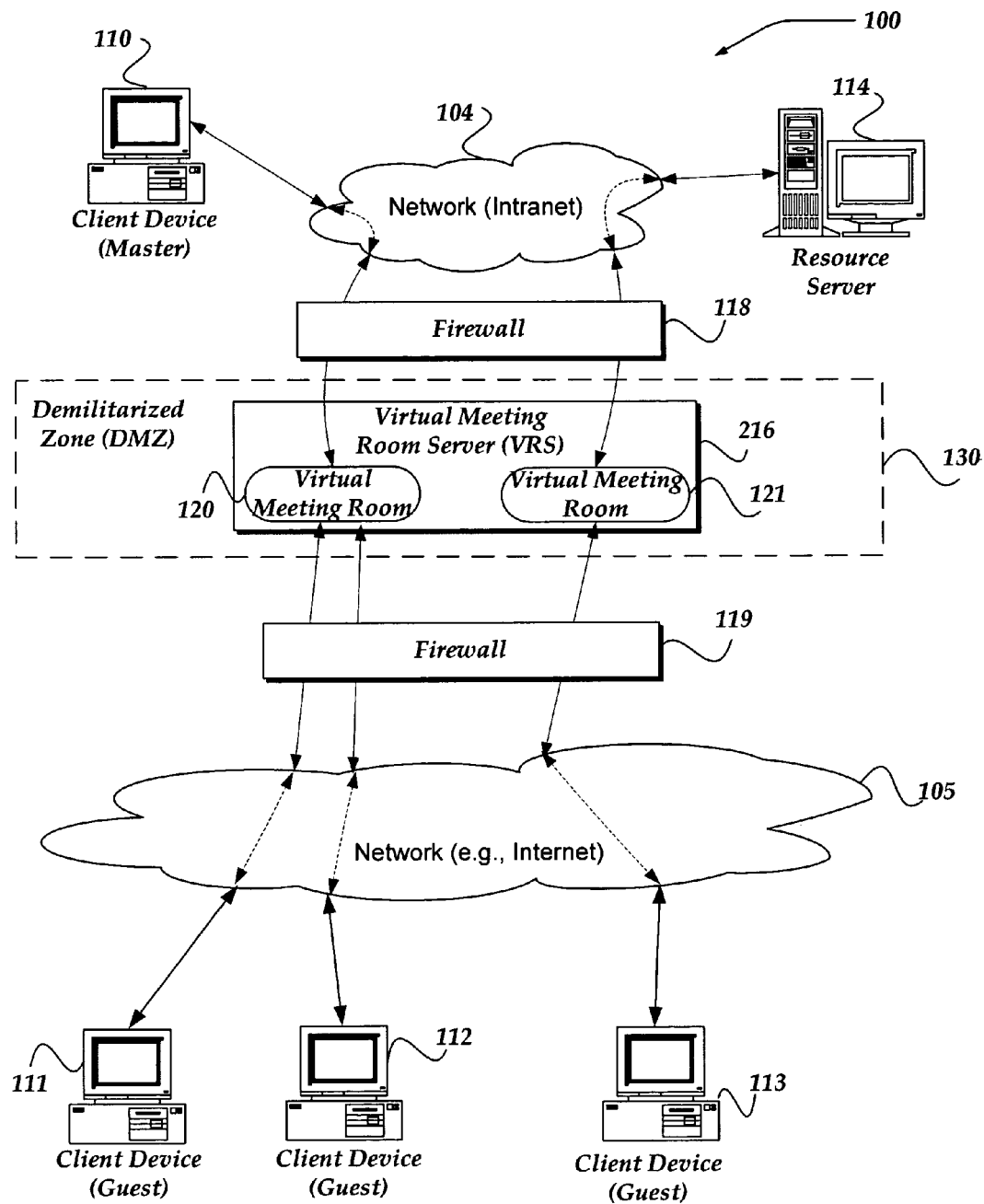
FIG. 2 illustrates another embodiment of an environment for practicing the invention.

FIG. 2 illustrates another environment in which the present invention may operate. Not all of the components illustrated may be required to practice the invention, and variations in the arrangement and type of the components may be made without departing from the spirit or scope of the invention. System 200 of FIG. 2 may also be employed to enable client devices to request and use virtual meeting rooms over a network, and even through a firewall or other security perimeter devices.

Moreover, system 200 may also be used to enable access by the client devices to resources that may be protected by the security perimeter.

As shown in FIG. 2, components with like reference numbers to those in FIG. 1 refer to like components that operate substantially similar. Moreover, VRS 216 of FIG. 2 operates substantially similar to VRS 116 of FIG. 1. Thus, system 200 of FIG. 2 is substantially similar to system 100 of FIG. 2, except that VRS 216 of FIG. 2 resides within DMZ 130, and between firewalls 118-119. FIG. 2 is intended to illustrate that placement of a virtual meeting room server is not constrained to residing on one side of a security perimeter. For example, a VRS may reside within the security perimeter; or although not shown, a VRS may reside on the Internet (network 105), without departing from the scope or spirit of the invention.

Illustrative VRS Environment

Figure 3:
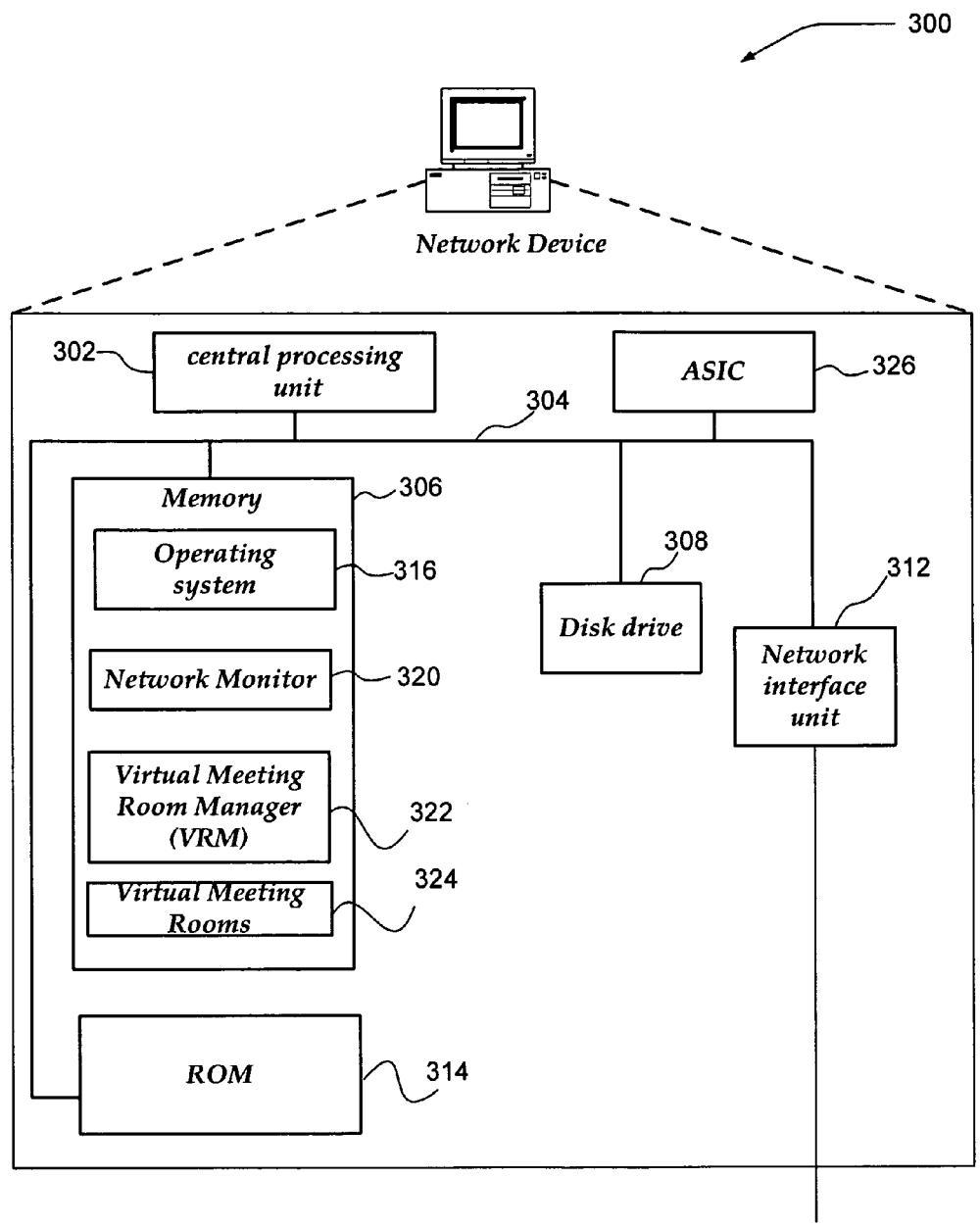
FIG. 3 illustrates one embodiment of a network device that may be used to manage virtual meeting rooms.

FIG. 3 shows an exemplary network device 300 that may operate as VRS 116 of FIG. 1, or VRS 216 of FIG. 2. It will be appreciated that not all components of network device 300 are illustrated, and that network device 300 may include more or less components than those shown in FIG. 3.

As illustrated in FIG. 3, network device 300 includes a central processing unit (CPU) 302, mass memory, and a network interface unit 312 connected via a bus 304. Network interface unit 312 includes the necessary circuitry for connecting network device 300 to various networks, and is constructed for use with various communication protocols including the TCP/IP and UDP/IP protocol. Network interface unit 312 may include or interface with circuitry and components for transmitting messages and data over a wired and/or wireless communications medium. Network interface unit 312 is sometimes referred to as a transceiver, Network Interface Card (NIC), or the like.

In one embodiment, network device 300 includes one or more Application Specific Integrated Circuit (ASIC) chip 326 connected to bus 304. As shown in FIG. 3, network interface unit 312 may connect to 304 bus through at least one ASIC chip. ASIC chip 326 can include logic that enables at least some of the actions of network device 300. For example, in one embodiment, ASIC chip 326 can be employed to perform packet processing functions on incoming and/or outgoing packets. In one embodiment, ASIC chip 326 performs logic for network monitor 320 and/or redirect coordinator 324. In one embodiment, network device 300 includes one or more field-programmable gate arrays (FPGA) (not shown), instead of, or in addition to, ASIC chip 326. A number of actions for the network device can be performed by ASIC chip 326, an FPGA, CPU 302 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 306, ROM 314, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 300 may also include an input/output interface (not shown) for communicating with external devices or users.

Network device 300 can be implemented as one or more "blades" where a "blade" is one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, or the like. An application running on a blade may employ any of these interfaces to communicate information to other applications running on other blades and/or devices coupled to the blade server. Network device 300 can also be implemented as a combination of blades and additional components in the chassis.

The mass memory generally includes random access memory ("RAM") 306, read-only memory ("ROM") 314, and one or more permanent mass storage devices, such as hard disk drive 308. The mass memory stores operating system 316 for controlling the operation of network device 300. The operating system 316 may comprise an operating system such as UNIX, LINUX™, or Windows™. In one embodiment, the mass memory may store program code and data for implementing Virtual Meeting Room Manager (VRM) 322, and virtual meeting rooms (VRs) 324.

VRs 324 refer to a pool of Virtual IP (VIP) addresses that have been allocated to and represent one or more virtual sub-networks. For example, a pool of VIP addresses may be allocated to and represent VR 120, while another pool may be allocated to and represent VR 121 of FIG. 1. VRs 324 may also include information that maps a VIP address to an actual IP address of a network device. Such mapping may be stored using any of a variety of mechanisms, including, but not limited to a spreadsheet, a database, a script, a file, folder, or the like.

VRM 322 manages creation and use of VRs, in part, by managing a creation of a pool of VIP addresses, allocating the VIP addresses to client devices, and by monitoring communications between the client devices, network device 400, and/or a resource server.

VRM 322 may manage creation of VRs by establishing one or more pools of VIP addresses useable for communications in the VR. VRM 322 may establish a pool based on a variety of conditions, including, for example, upon a request from a 'master' client device for a reservation of a VR. VRM 322 may store the established pool within VR 324.

Upon a request for a VR, VRM 322 may also provide an identifier associated with the established VR. Moreover, VRM 322 may provide a meeting descriptor that may include a room identifier, and/or a session identifier that may be associated with a client device. VRM 322 may also provide a credential that may be used to authenticate and enable access to the VR by a client device. The credential may be implemented as a token, such as a Kerberos type token; a digital certificate, such as an X.509 certificate, a hash, a private session key, a name/password, or the like.

When a client device requests to join a VR, VRM 322 may authenticate the client device using, in part, the credential, meeting descriptor, and/or other information. In one embodiment, VRM 322 may further provide the client device a Virtual Meeting Room Client (VRC) (described below) to enable the client device to establish a secure communications with network device 400 to communicate with one or more other network devices through the VR.

VRM 322 is further configured to receive a communication from one network device and forward the communication to a destination. VRM 322 may, for example, examine the communication to determine a VIP address associated with the destination, and employ the mapping between an actual IP addresses and the VIP addresses to prepare and send the communication. In one embodiment, the communications are secure, using such as SSL, TLS, IPSec, or the like. In which instance, VRM 322 may decrypt the received communication to determine the destination. VRM 322 may then encrypt the communication prior to sending it towards its destination. VRM 322 may provide the communication to a single destination, or based on the communication, broadcast the communication to other network devices within the VR.

VRM 322 may also monitor the communications for compliance to at least one communication constraint. The at least one communication constraint may include any of a variety of rules, constraints, or the like. For example, the usage rule may indicate that communication is between VR members and not between a VR member and a non-VR member; that inter-room communications is not allowed; that access to a resource may be restricted; that communications may be limited to peer to peer (e.g., from one VR member to another VR member), rather than being broadcast; or the like. The communication constraint may also identify whether the VR requires authentication of each client device attempting to join the VR, or not. In one embodiment, at least a rule within a set of communication constraints may be defined by a master client device. Moreover, VRM 322 may employ a process such as described below in conjunction with FIG. 5 to perform at least some of its actions. VRM 322 may also participate in a signal flow such as described below in conjunction with FIG. 6.

Illustrative Client Device

Figure 4:
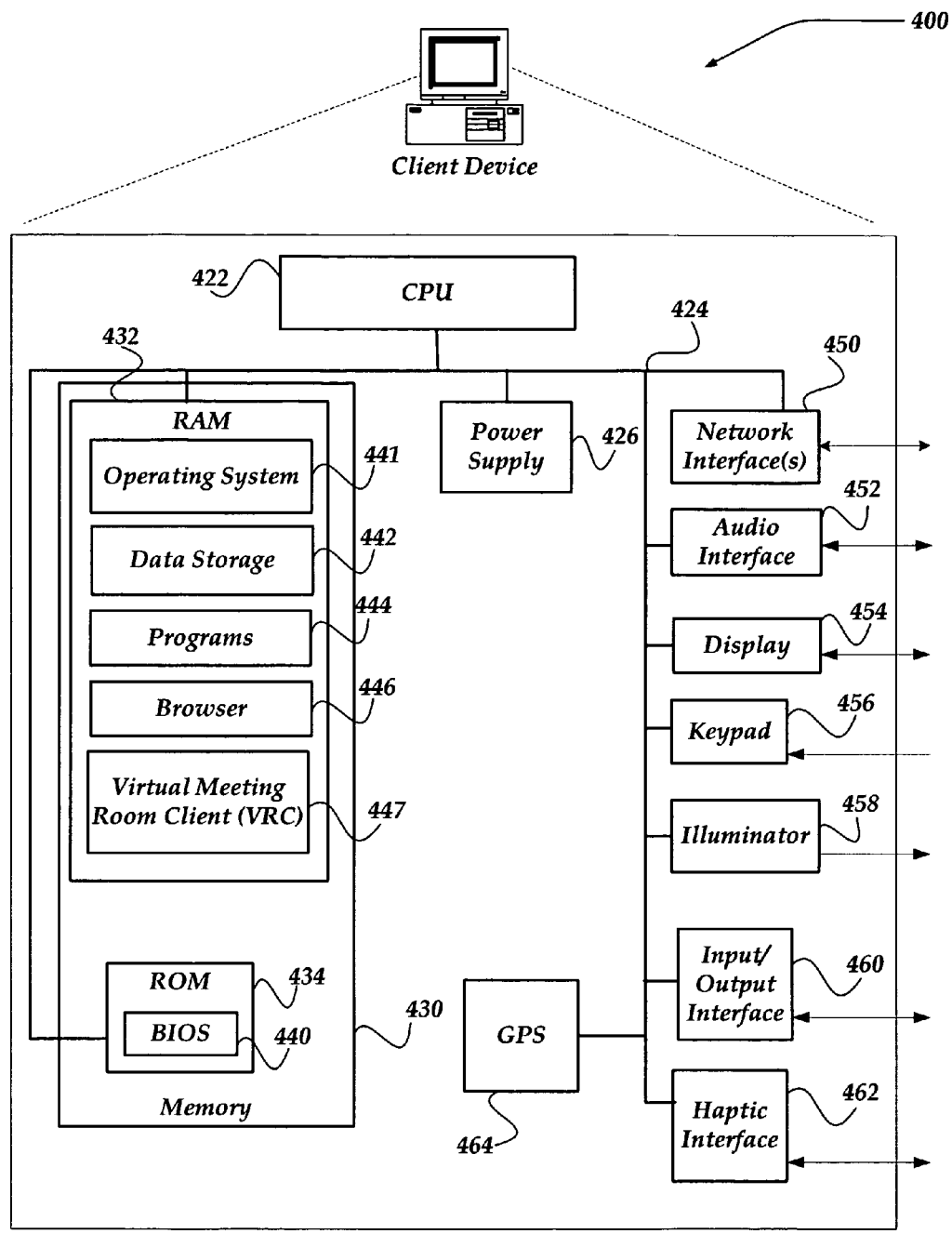
FIG. 4 illustrates one embodiment of a client device that may employ a virtual meeting room.

FIG. 4 shows one embodiment of client device 400 that may be included in a system implementing the invention. Generally, client device 400 may comprise any personal electronic device. Oftentimes, electronic devices will be capable of personal communication by connecting to one or more wired and/or wireless networks, connecting to multiple nodes of a single wired and/or wireless network, communicating over one or more channels to one or more networks, or otherwise engaging in one or more communication sessions. Client device 400 may, for example, comprise electronic devices such as Personal Digital Assistants (PDAs), handheld computers, personal computers, multiprocessor systems, microprocessor-based or programmable consumer electronics, network PCs, wearable computers, or the like. Client device 400 may also comprise a server device.

Client device 400 may include many more or less components than those shown in FIG. 4. However, the components shown are sufficient to disclose an illustrative embodiment for practicing the present invention. As shown in the figure, client device 400 includes a processing unit 422 in communication with a mass memory 430 via a bus 424.

Client device 400 also includes a power supply 426, one or more network interfaces 450, an audio interface 452, a display 454, a keypad 456, an illuminator 458, an input/output interface 460, a haptic interface 462, and an optional global positioning systems (GPS) receiver 464. Power supply 426 provides power to client device 400. A rechargeable or non-rechargeable battery may be used to provide power. The power may also be provided by an external power source, such as an AC adapter or a powered docking cradle that supplements and/or recharges a battery.

Client device 400 may optionally communicate with a base station (not shown), or directly with another computing device. Network interface 450 includes circuitry for coupling client device 400 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or the like.

Audio interface 452 is arranged to produce and receive audio signals such as the sound of a human voice. For example, audio interface 452 may be coupled to a speaker and microphone (not shown) to enable telecommunication with others and/or generate an audio acknowledgement for some action. Display 454 may be a liquid crystal display (LCD), gas plasma, light emitting diode (LED), or any other type of display used with a computing device. Display 454 may also include a touch sensitive screen arranged to receive input from an object such as a stylus or a digit from a human hand.

Keypad 456 may comprise any input device arranged to receive input from a user. For example, keypad 456 may include a push button numeric dial, or a keyboard. Keypad 456 may also include command buttons that are associated with selecting and sending images. Illuminator 458 may provide a status indication and/or provide light. Illuminator 458 may remain active for specific periods of time or in response to events. For example, when illuminator 458 is active, it may backlight the buttons on keypad 456 and stay on while the client device is powered. Also, illuminator 458 may backlight these buttons in various patterns when particular actions are performed, such as dialing another client device. Illuminator 458 may also cause light sources positioned within a transparent or translucent case of the client device to illuminate in response to actions.

Client device 400 also comprises input/output interface 460 for communicating with external devices, such as a headset, or other input or output devices not shown in FIG. 4. Input/output interface 460 can utilize one or more communication technologies, such as USB, infrared, Bluetooth™, or the like. Haptic interface 462 is arranged to provide tactile feedback to a user of the client device. For example, the haptic interface may be employed to vibrate client device 400 in a particular way when another user of a computing device is calling.

Optional GPS transceiver 464 can determine the physical coordinates of client device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SAI, ETA, BSS or the like, to further determine the physical location of client device 400 on the surface of the Earth. It is understood that under different conditions, GPS transceiver 464 can determine a physical location within millimeters for client device 400; and in other cases, the determined physical location may be less precise, such as within a meter or significantly greater distances.

Mass memory 430 includes a RAM 432, a ROM 434, and other storage means. Mass memory 430 illustrates another example of computer storage media for storage of information such as computer readable instructions, data structures, program modules or other data. Mass memory 430 stores a basic input/output system ("BIOS") 440 for controlling low-level operation of client device 400. The mass memory also stores an operating system 441 for controlling the operation of client device 400. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 430 further includes one or more data storage 442, which can be utilized by client device 400 to store, among other things, programs 444 and/or other data. For example, data storage 442 may also be employed to store information that describes various capabilities of client device 400. The information may then be provided to another device based on any of a variety of events, including being sent as part of a header during a communication, sent upon request, or the like.

Programs 444 may include computer executable instructions which, when executed by client device 400, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth. In addition, mass memory 430 stores browser client 446, and Virtual meeting Room Client (VRC) 447.

Browser client 446 may include computer executable instructions, which may be run under control of operating system 441 to enable and manage requesting, receiving, and rendering markup pages such as WAP pages (sometimes referred to as WAP cards), SMGL, HTML, HDML, WML, WMLScript, JavaScript, or the like.

VRC 447 is configured to enable client device 400 to establish communications with another network device to access and employ a virtual meeting room. In one embodiment, VRC 447 may be downloaded over a network from another network device. However, VRC 447 may also be emailed, FTP'ed, or otherwise made available for use by client device 400 using any of a variety of mechanisms, including being accessed and executed remotely.

In one embodiment, VRC 447 may be provided to client device 400 upon satisfactory authentication of client device 400. In another embodiment, VRC 447 may be provided to client device 400 prior to the authentication. VRC 447 may, in one embodiment, store credentials, and other session information, that enables authentication and/or establishment of a secure communications through the virtual meeting room. VRC 447 may communicate over a secure communications through the virtual meeting room (e.g., over the virtual sub-network), using any of a variety of secure communications mechanisms, including but not limited to SSL/TLS, HTTPS, SSL VPN, IPSec VPN, or the like. VRC 447 may participate in a signal flow such as described below in conjunction with FIG. 6.

Moreover, VRC 447 may be implemented as an application; however, the invention is not so limited. For example, VRC 447 may also be implemented as a java script, an applet, a script, an API, or the like.

Generalized Operation

Figure 5:
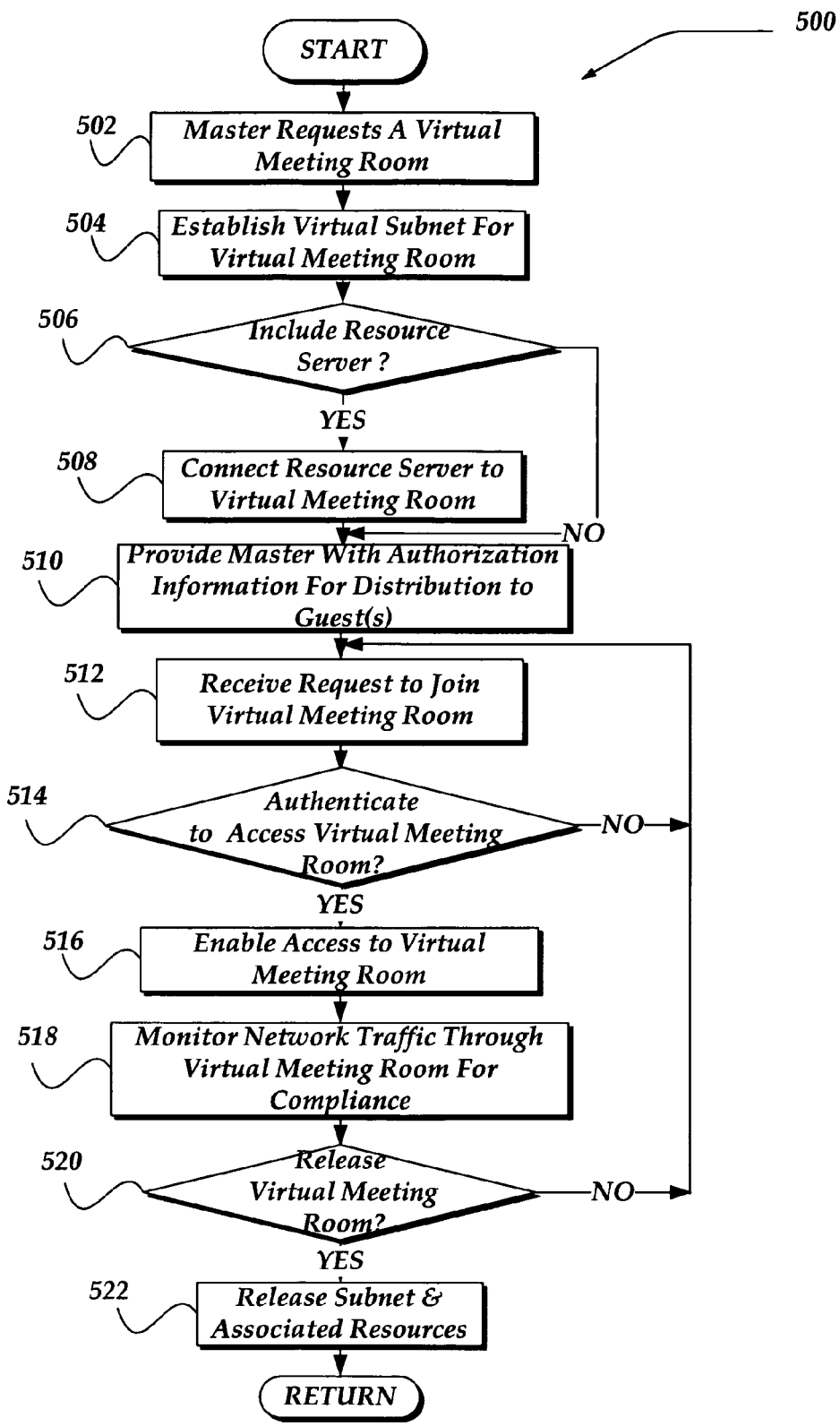
FIG. 5 illustrates a logical flow diagram generally showing one embodiment of a process for managing a virtual meeting room through a firewall.

The operation of certain aspects of the invention will now be described with respect to FIGS. 5-6. FIG. 5 illustrates a logical flow diagram generally showing one embodiment of a process for managing a virtual meeting room through a firewall. Process 500 of FIG. 5 may be implemented, for example, within VRS 116 and VRS 216 of FIGS. 1 and 2, respectively.

Process 500 begins, after a start block, at block 502, when a master client device requests a virtual meeting room (VR). In one embodiment, the master client device may request that the VR be available during a particular period of time. In one embodiment, the request may include information associated with a restraint on access to and/or use of the VR, such as whether authentication is to be employed, or the like. The request may also indicate a number of client devices intended to participate in the VR, whether a protected resource may be employed with the VR, other access policies, or the like.

Processing next flows to block 504, where a virtual sub-network, including a pool of VIP addresses are established useable as a virtual meeting room through a security perimeter. Processing continues to decision block 506, where a determination is made whether the request includes a request for a protected resource server, or the like. If it is determined that the request is also for a protected resource server, processing flows to block 508, where the protected resource server may be assigned a VIP address within the VR, so that it may be accessed through the VR. Processing then flows to block 510. If, however, the request does include a request for a protected resource server, processing also flows to block 510.

At block 510, information associated with the VR is provided to the master client device. In one embodiment, the information may be provided along with a Universal Resource Locator (URL) to the VR. Such information may include, but is not limited to a room identifier, a meeting descriptor, a credential, or the like. The master client device may then select to provide the information, including the URL, to one or more 'guest' client devices.

Processing next continues to block 512, where a request to join the VR is received. The request to join may be received from the master client device, or a guest client device. Process 500 flows to decision block 514, where a determination is made whether the requesting client device is authenticated to access the virtual meeting room. In one embodiment, the authentication may be determined based on the client device providing a credential, or the like, which may be used to authenticate the client device. If, it is determined that the client device is authentic, processing may flow to block 516; otherwise, processing may loop back to block 512 to receive another request to join the VR. In one embodiment, the other request may be from the client device that was not authenticated to join the VR. In another embodiment, the other request may be from a different client device.

At block 516, the authenticated client device is enabled to access the VR and establish a secure communications. In one embodiment, this may be performed, at least in part, by providing to the client device a session identifier associated with the VR. In one embodiment, this may also be performed, in part, by downloading to the client device a VRC application that may be used to establish and manage a secure communications using the VR.

Processing next flows to block 518, where network traffic using the VR is monitored for compliance to a communication constraint. In one embodiment, where the communications is encrypted, monitoring may include decrypting the secure communications, and examining the decrypted communications for compliance. If the decrypted communications complies with the communication constraint, the communications may be encrypted and forwarded to its destination.

In one embodiment, non-compliance to the communication constraint may result in inhibiting the forwarding of the communications. In one embodiment, non-compliance may also result in another message, such as a warning message, a message indicating non-delivery, or the like, being sent to the originator of the non-compliant communications. In one embodiment, access to the VR being terminated for the originator of a non-compliant message.

In any event, monitoring of network traffic through the VR may continue dynamically as long as the VR is available. However, at decision block 520, if it is determined that the VR is to be released, processing may flow to block 522; otherwise, processing loops back to block 512, to monitor for additional requests to join the VR.

At block 522, the VR and any resources associated with the VR may be released and made unavailable for use in its current configuration. For example, the VIP addresses assigned to the VR may be made available to be reassigned to a different VR. Process 500 then returns to a calling process to perform other actions.

Figure 6:
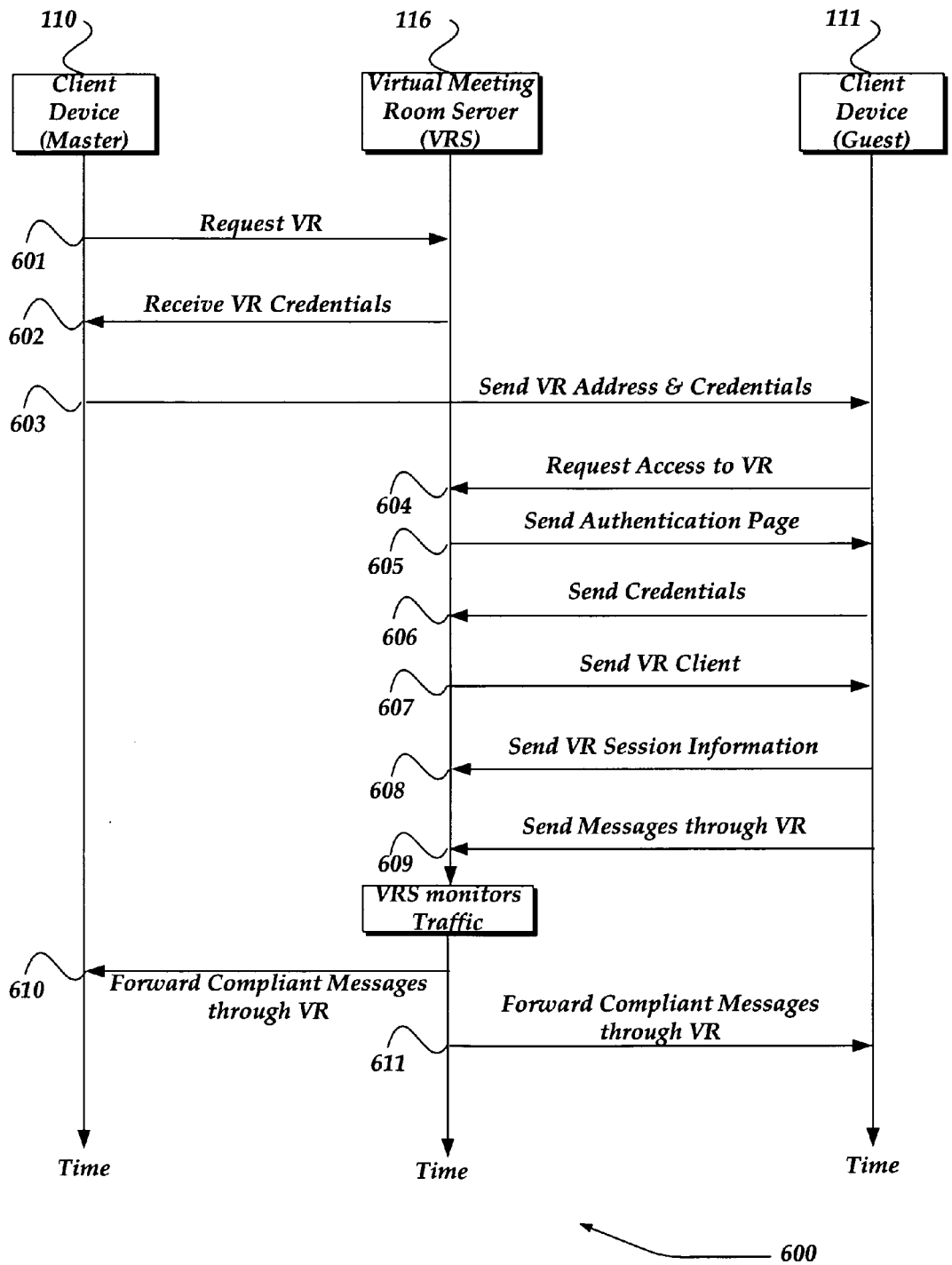
FIG. 6 illustrates a message flow diagram generally showing one embodiment of message flows useable in establishing and employing a virtual meeting room through a firewall, in accordance with the invention.

FIG. 6 illustrates a message flow diagram generally showing one embodiment of message flows useable in establishing and employing a virtual meeting room through a firewall or other security perimeter device. Flow 600 represents one embodiment of a message flow between such components of FIG. 1 as master client device 110, VRS 116, and guest client device 111. As shown, time may be considered to flow downwards. In one embodiment, flow 600 may, for example, occur as part of process 500 of FIG. 5.

Flow 600 may begin at time 601, when master client device 110 provides a request for a VR to VRS 116. As described above, the request may include a request to reserve a VR for a particular period of time or times. Moreover, the request may include a request for a protected resource, an identification of a number of potential guests, an access restriction on the VR, or the like. In one embodiment, the request may be over HTTP, although it may also be through email, IM, SMS, or the like. Flow 600 continues to time 602, where VRS 116 may provide to master client device 110 a URL associated with the requested VR. The response at time 602 may also include a room identifier, meeting descriptor, including a session identifier, a credential, or the like.

At time 603, master client device 110 may distribute to one or more guest client devices, such as client device 111, the URL, and related information useable to join and participate in communications using the VR.

Flow 600 then continues to time 604, where client device 111 may send a request to join the VR. Although, flow 600 illustrates the request to join coming from a guest client device, the invention is not so restricted. For example, the request to join the VR may also come from the master client device. In any event, the request may, in one embodiment, be provided to VRS 116 using a browser, an email client, or the like. The request to join the VR may include the room identifier, meeting descriptor, or the like. In response, at time 605, VRS 116 may provide an authentication web page, script, application, or the like, useable, in part, to obtain authentication information.

At time 606, client device 111 may provide authentication information, including the credential, or the like. If client device 111 is authenticated and authorized to join the VR, at time 607, VRS 116 may download, or otherwise make available to client device 111 a VR Client (VRC) for use in establishing and managing secure communication over the virtual sub-network associated with the VR. In one embodiment, VRS 116 may also provide to client device 111 a session identifier, or other information useable by the VRC. Client device 111 may, in one embodiment, install the VRC and/or otherwise enable its execution.

At time 608, client device 111 may then employ the VRC, at least in part, to establish a secure communications between VRS 116 and itself. In one embodiment, the secure communications is over a VPN using SSL, TLS, IPSec, or the like. As part of establishing the secure communications, VRS 116, may receive from client device 111 the session identifier for use in assigning a VIP within the VR.

At time 609, client device 111 may then employ the VR to provide a secure message. In one embodiment, the message may include a VIP address associated with a destination address within the VR. The message may further include a VIP address associated with client device 111.

The message, along with the VIP addresses may be encrypted using any of a variety of encryption mechanisms, including, but not limited, to an RSA algorithm, Data Encryption Standard (DES), International Data Encryption Algorithm (IDEA), Skipjack, RC4, Advanced Encryption Standard (AES), Elliptic Curve Cryptography, or the like. The message may further be modified to such that its destination address is the actual IP address associated with VRS 116, and its source address may be the actual IP address of client device 111. The message may then be transported over the established SSL VPN, where VRS 116 may decrypt the message and determine whether it complies with the communication constraint. If the message complies with the communication constraint, VRS 116 may re-encrypt the message and forward to an actual destination address associated with VIP destination address within the message. Moreover, VRS 116 may replace the actual source IP address of the message with its own actual IP address. At time 610, VRS 116 may then forward the modified compliant message towards its destination. VRS 116 may continue to receive, monitor for compliance, and forward secure messages between client devices, and/or resources until the VR is released. Determination of a release of the VR may be based on a variety of events, conditions, or the like. For example, in one embodiment, the VR may be released when a determined time period for the VR is expired, when all client devices have exited the VR, when a security threat is detected, or the like. In any event, upon release of the VR, the assigned resources, VIP addresses, and the like, are released. Flow 600 may then terminate.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method of managing a communication over a network, comprising:

receiving, at a Virtual Meeting Room Server (VRS) device, a request from a master client device for a virtual meeting room, the master client device being different from the VRS device and wherein the master client device is the client device that requests the virtual meeting room;

establishing a virtual sub-network for the virtual meeting room through a security perimeter, wherein a pool of Virtual Internet Protocol (VIP) addresses are assigned for use with the virtual meeting room;

receiving, at the VRS device, a request to join the virtual meeting room from a client device other than the master client device, the client device receiving virtual meeting room information from the master client device;

determining if the client device is authentic based on a credential, wherein the credential is received by the client device from the master client device;

if a client device is authenticated to join the virtual meeting room, assigning a VIP address from the pool to the client device and enabling the client device to establish a secure communications into the virtual meeting room through the security perimeter using the VIP address; and monitoring the secure communications from the client device by having each communications be sent through the VRS device for analysis by the VRS device for compliance to a communication constraint, including when a message from the client device in the virtual meeting is to a destination unassociated with the virtual meeting room, inhibiting the forwarding of the message from the client device in the virtual meeting to the destination unassociated with the virtual meeting room.

2. The method of claim 1, wherein monitoring the secure communications by the VRS device for compliance to the communication constraint further comprises;

if a message over the secure communications is sent as a broadcast message and the communication constraint restricts broadcast messages then inhibiting the forwarding of the message.

3. The method of claim 1, wherein the secure communication employs an SSL Virtual Private Network protocol.

4. The method of claim 1, wherein the VRS device is configured to receive each secure communications between the client and another device within the virtual sub-network, and to decrypt each received communications;

examine the decrypted communication, and determine if the decrypted communication complies with the communication constraint;

if the communication complies with the communication constraint, re-encrypting the communication and forwarding the re-encrypted communication; and if the communication fails to comply with the communication constraint, inhibiting forwarding of the communication.

5. The method of claim 1, further comprising, employing a computer readable storage medium for storing program instructions for performing the steps of claim 1 over the network.

6. A network device for communicating data over a network, comprising:

a transceiver to send and receive data over the network; and a processor that is operative to perform actions comprising:

receiving a request from a master client device to establish a virtual meeting room, wherein the master client device is the client device that requests the virtual meeting room from the master client device being different from the network device;

in response to the request, establishing a virtual sub-network useable as a virtual meeting room through a firewall, wherein a pool of Virtual Internet Protocol (VIP) addresses are assigned for use by authenticated client devices within the virtual meeting room;

receiving a request from a client device other than the master client device to join the virtual meeting room, wherein the client device is distributed virtual meeting room information, including a credential, from the master client device, prior to requesting to join the virtual meeting room;

if a client device is authenticated to join the virtual meeting room based on the credential, assigning a VIP address from the pool to the client device for use in enabling the client device to establish a secure communications into the virtual meeting room;

receiving the secure communications from the client device using the VIP address;

decrypting the secure communications;

examining the decrypted communications for compliance to a communication constraint;

if the decrypted communications complies with the communication constraint, encrypting the communications and forwarding the encrypted communications to a destination; and when the decrypted communications is to a destination unassociated with the virtual meeting room, inhibiting forwarding of the encrypted communications from the client device using the VIP address to the destination unassociated with the virtual meeting room.

7. The network device of claim 6, the actions further comprising:

receiving a request from the client to join the virtual meeting room; and authenticating the client based on the credential.

8. The network device of claim 6, wherein establishing a virtual sub-network further comprises:

receiving a request for a protected resource for use with the virtual sub-network; and assigning a VIP address from the pool to the protected resource useable within the virtual sub-network.

9. The network device of claim 6, wherein examining the decrypted communications for compliance to the communication constraint further comprises:

determining whether the destination of the communications is to another virtual meeting room, and if it is so directed, inhibiting the forwarding of the communications.

10. The network device of claim 6, wherein examining the decrypted communications for compliance to the communication constraint further comprises:

determining whether the destination of the communications is to a computing device unassociated with the virtual meeting room, and if so, inhibiting the forwarding of the communications.

11. The network device of claim 6, the actions further comprising:

if the decrypted communications is non-compliant with the communication constraint, inhibiting the forwarding of the secure communications to the destination, and providing a message to the client device indicating that the forwarding is inhibited wherein the message to the client device indicates a warning message regarding non-compliance with the communication constraint.

12. The network device of claim 6, wherein enabling the client device to establish a secure communications further comprises downloading to the client device an application useable to initiate the secure communications with the network device.

13. A system useable in managing communications over a network, comprising:
- a client device operative to perform actions, including:
  - sending a request for a virtual meeting room to be established, wherein the sending of the request indicates that the client device is a master client device;
  - receiving virtual meeting room information, including a credential;
  - distributing the virtual meeting room information, including the credential to at least one other client device;
  - employing the credential to access the virtual meeting room; and
  - providing a secure message using the virtual meeting room; and
- an intermediate device operative to perform actions, including:
  - establishing the virtual meeting room including allocating, a pool of Virtual Internet Protocol (VIP) addresses to the virtual meeting room;
  - receiving a request to join the virtual meeting room, from at least one other client device that provides the credential to the intermediate device the other client device receiving the virtual meeting room information, including a credential, the client device being distinct from the intermediate device;
  - authenticating the at least one other client device based, in part, on the credential;
  - assigning a VIP address from the pool to the authenticated at least one other client device to enable the at least one other client device to communicate in the virtual meeting room;
  - receiving the secure message from the client device using the assigned VIP address;
  - decrypting the secure message;
  - examining the secure message for compliance to a communication constraint;
  - if the secure message complies with the communication constraint, re-encrypting the message and providing the secure re-encrypted message to a destination address associated with the secure message; and
  - when the secure message is to a destination un-associated with the virtual meeting room, inhibiting forwarding of the secure message to the destination un-associated with the virtual meeting room from the client device using the assigned VIP address.

14. The system of claim 13, wherein the client device and a computing device associated with the destination address reside on opposing sides of a security perimeter.

15. The system of claim 13, the actions of the client device further comprising:
- receiving the credential, wherein the client device is a master client device having further requested the establishing of the virtual meeting room; and
- distributing the credential to at least one other client device.

16. The system of claim 13, wherein the secure message is communicated using an SSL VPN.

17. The system of claim 13, the actions of the intermediate device further comprising:
- downloading to the client device a software component that is configured enable establishment of a secure channel with the intermediate device.

18. The system of claim 13, wherein examining the secure message further comprises decrypting the secure message and examining at least one of the destination address, or a request within payload of the message.

19. The system of claim 13, wherein examining the secure message further comprises:
- examining the destination address associated with the secure message to determine when the secure message is un-associated with the virtual meeting room.

20. The system of claim 13, wherein providing the secure message to the client device further comprises:
- examining the decrypted message to determine a destination virtual IP address;
- mapping the destination virtual IP address to an IP address associated with the client device;
- encrypting the message; and
- sending the encrypted message to the client device using the mapped IP address.

21. The system of claim 13, the actions of the client device further comprising:
- requesting a reservation for a virtual meeting room; and
- receiving confirmation of the reservation, including the credential.

* * * * *